(12) United States Patent
Sharma et al.

(10) Patent No.: US 8,949,754 B1
(45) Date of Patent: Feb. 3, 2015

(54) SYSTEM, METHOD, AND COMPUTER PROGRAM PRODUCT FOR VERIFICATION USING X-PROPAGATION

(71) Applicant: Cadence Design Systems, Inc., San Jose, CA (US)

(72) Inventors: Amit Sharma, Noida (IN); Amit Aggarwal, Ghaziabad (IN); Manu Chopra, New Delhi (IN); Abhishek Raheja, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/108,902

(22) Filed: Dec. 17, 2013

(51) Int. Cl.
*G06F 17/50* (2006.01)

(52) U.S. Cl.
CPC .......... *G06F 17/5009* (2013.01); *G06F 17/504* (2013.01)
USPC .......................................... 716/106; 716/109

(58) Field of Classification Search
None
See application file for complete search history.

(56) References Cited

U.S. PATENT DOCUMENTS

| | | | |
|---|---|---|---|
| 7,735,030 B1* | 6/2010 | Kalil et al. | 716/136 |
| 2005/0229127 A1* | 10/2005 | Warren | 716/6 |
| 2010/0192115 A1* | 7/2010 | Yang et al. | 716/5 |
| 2010/0313185 A1* | 12/2010 | Gupta et al. | 717/124 |
| 2011/0161897 A1* | 6/2011 | Maturana et al. | 716/102 |

* cited by examiner

*Primary Examiner* — Leigh Garbowski
(74) *Attorney, Agent, or Firm* — Holland & Knight LLP; Mark H. Whittenberger, Esq.

(57) ABSTRACT

The present disclosure relates to a computer-implemented method for electronic design verification. The method may include providing, using a processor, a low-power electronic design and determining if a power domain associated with the low-power electronic design is active. The method may further include identifying, at a register transfer level (RTL) at least one X value associated with an active power domain wherein identifying occurs during a simulation.

20 Claims, 5 Drawing Sheets

SYSTEM, METHOD, AND COMPUTER PROGRAM PRODUCT FOR VERIFICATION USING X-PROPAGATION

FIELD OF THE INVENTION

The present disclosure relates to electronic design verification, and more specifically, to a method for electronic design verification using X-Propagation.

DISCUSSION OF THE RELATED ART

In the electronic design automation ("EDA") field, an X-bug or X-value generally corresponds to a don't care value, an unknown value, or a wildcard value. For example, in the simulation of an electronic design, the standard hardware description language ("HDL") simulation semantics conceal X-bugs as they may not propagate X values in certain scenarios. This may happen due to X-optimism, which yields fewer unknown values resulting in hidden X-bugs. These bugs are generally uncovered during Gate Level Simulation which is too slow for modern System-on-a-chip ("SoCs"), and catching X-bugs at the Gate Level may involve added cost as it comes late in the cycle and results in further register transfer level ("RTL") iterations to fix the X-bugs.

Low Power Designs are a major source of X's during simulation when power is being turned off or restored in some of the blocks. For example, in a low power design when a domain is powered off, it must be isolated from the rest of the system. This is achieved by using isolation logic which drives some valid values to powered on and active domains that were driven by the powered off domain. In the absence of isolation logic or due to bugs in isolation logic, X's from the powered off domain may get driven into the powered on domain resulting in corruption of logic in the active domains. The same problem may occur when power is being restored in a domain, the isolation logic needs to be removed but not before the power is completely restored and the domain starts driving correct values as per the logic inside the domain. Bugs in this sequence may again push X's to the connected domains.

Verification of low power logic including isolation logic is currently performed using ad-hoc verification solutions. For example, RTL simulations require test bench elements to mimic the state retention, power switch off and isolation. For isolation, the value to be isolated needs to be forced on the primary outputs of the test bench elements. For state retention the verification or design engineer must first identify all registers whose state is to be retained. A test-bench element must be created to store values from the registers when the retention sequence occurs. The values are deposited back to the registers by the test-bench element after restore sequence take places. For power switch off, all nodes must be forced to X by test bench elements. As the design grows this task becomes even more bug prone and needs careful writing as all this identification is manual and must be translated into appropriate test bench code. Even after all this, if X's creep in due to bug in test bench, they will go undetected.

Gate level simulations have isolation cells and state retention registers in the netlist. Therefore, the test bench is not required to model these elements. Since there is no way to verify that the elements e.g. isolation and retention, identified in RTL are the same as are present in the gate netlist, the full verification suite must be re-run. The need of gate level simulation means the design defects will not be identified until late in the verification cycle and fixing them will be expensive.

One example, is that of a CPF/UPF Verification solution that involves writing a specification file with the power related information. The file contains a description of the low power architecture of design: which domains can be powered off, which values to isolate, and which registers to retain. In addition, the power control signals that govern when to retain, restore and isolate are contained within the file. This file is consumed by the RTL simulator and based on the information the simulator takes care of isolating the output of the powered off domain.

SUMMARY OF DISCLOSURE

In one or more embodiments of the present disclosure, a computer-implemented method for electronic design verification is provided. The method may include providing, using a processor, a low-power electronic design and determining if a power domain associated with the low-power electronic design is active. The method may further include identifying, at a register transfer level (RTL) at least one X value associated with an active power domain wherein identifying occurs during a simulation.

One or more of the following features may be included. In some embodiments, the method may further include if the power domain associated with the low-power electronic design is inactive, ignoring the power domain. The method may also include ignoring a second X value during at least one of a power up and a power down sequence. The method may further include displaying, at a graphical user interface, an interface port associated with the at least one X value, the interface port indicating an entry point for the at least one X value. The method may also include generating information related to the at least one X value, the information including one or more of file, line, scope and time of detection of the at least one X value. In some embodiments, the at least one X value may include one or more of don't care X values, unknown X values, and wildcard X values. The method may further include allowing, at a graphical user interface, a user-selectable option to identify and display a cause of the at least one X-value.

In one or more embodiments of the present disclosure a computer-readable storage medium having stored thereon instructions, which when executed by a processor result in one or more operations is provided. Operations may include providing, using a processor, a low-power electronic design and determining if a power domain associated with the low-power electronic design is active. Operations may further include identifying, at a register transfer level (RTL) at least one X value associated with an active power domain wherein identifying occurs during a simulation.

One or more of the following features may be included. In some embodiments, operations may further include if the power domain associated with the low-power electronic design is inactive, ignoring the power domain. Operations may also include ignoring a second X value during at least one of a power up and a power down sequence. Operations may further include displaying, at a graphical user interface, an interface port associated with the at least one X value, the interface port indicating an entry point for the at least one X value. Operations may also include generating information related to the at least one X value, the information including one or more of file, line, scope and time of detection of the at least one X value. In some embodiments, the at least one X value may include one or more of don't care X values, unknown X values, and wildcard X values. Operations may further include allowing, at a graphical user interface, a user-selectable option to identify and display a cause of the at least one X-value.

In one or more embodiments of the present disclosure, a system for electronic design verification is provided. The system may include one or more processors configured to provide a low-power electronic design and determine if a power domain associated with the low-power electronic design is active. The one or more processors configured to identify, at a register transfer level (RTL) at least one X value associated with an active power domain wherein identifying occurs during a simulation.

One or more of the following features may be included. In some embodiments, if the power domain associated with the low-power electronic design is inactive, the one or more processors may be configured to ignore the power domain. The one or more processors may be configured to ignore a second X value during at least one of a power up and a power down sequence. The one or more processors may be configured to display, at a graphical user interface, an interface port associated with the at least one X value, the interface port indicating an entry point for the at least one X value. The one or more processors may be configured to generate information related to the at least one X value, the information including one or more of file, line, scope and time of detection of the at least one X value. In some embodiments, the at least one X value may include one or more of don't care X values, unknown X values, and wildcard X values. The one or more processors may be configured to allow, at a graphical user interface, a user-selectable option to identify and display a cause of the at least one X-value.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
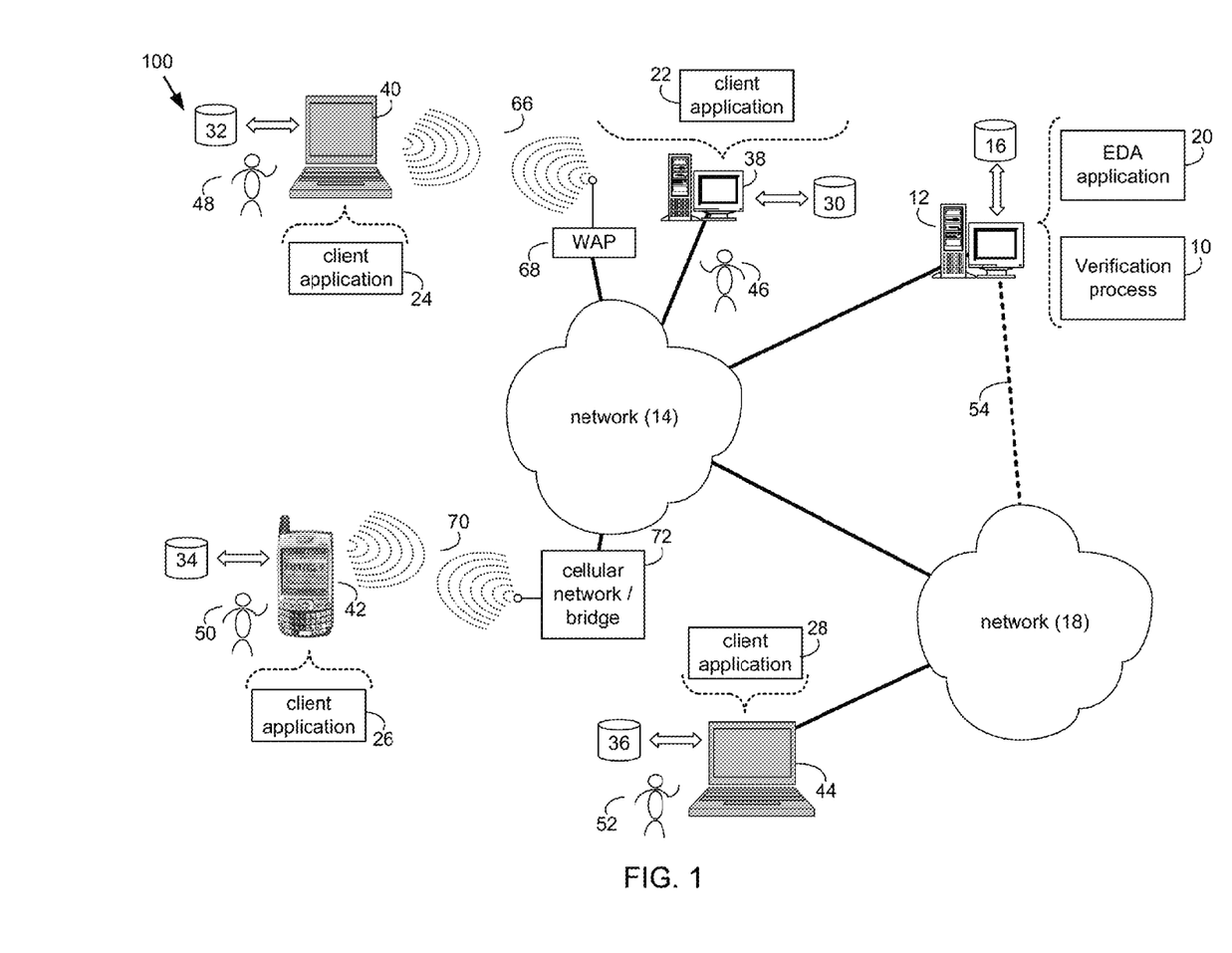
FIG. 1 is a diagram depicting an embodiment of a system in accordance with the present disclosure.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
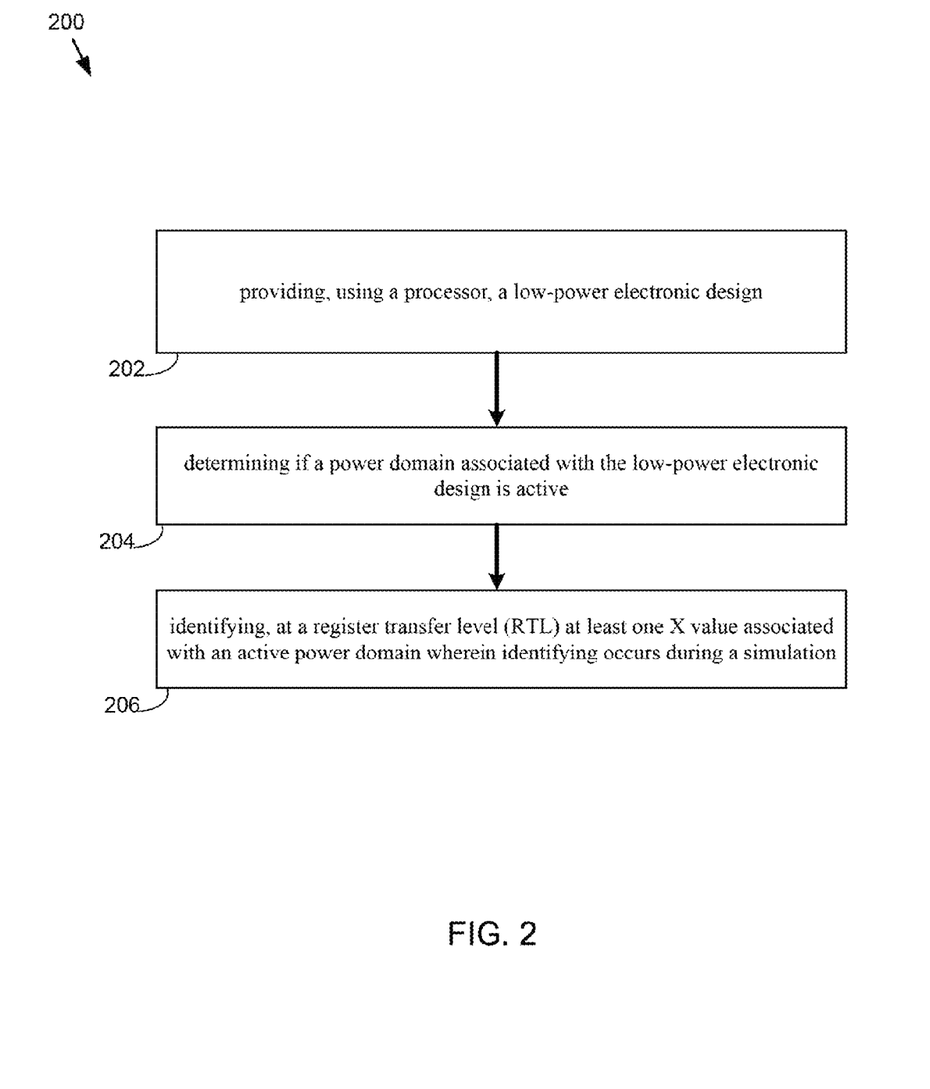
FIG. 2 is a flowchart depicting operations consistent with the verification process in accordance with an embodiment of the present disclosure.

Referring now to FIG. 2, an exemplary flowchart 200 depicting operations consistent with verification process 10 is provided. Operations may include providing (202), using a processor, a low-power electronic design and determining (204) if a power domain associated with the low-power electronic design is active. Operations may further include identifying (206), at a register transfer level (RTL) at least one X value associated with an active power domain wherein identifying occurs during a simulation.

Figure 3:
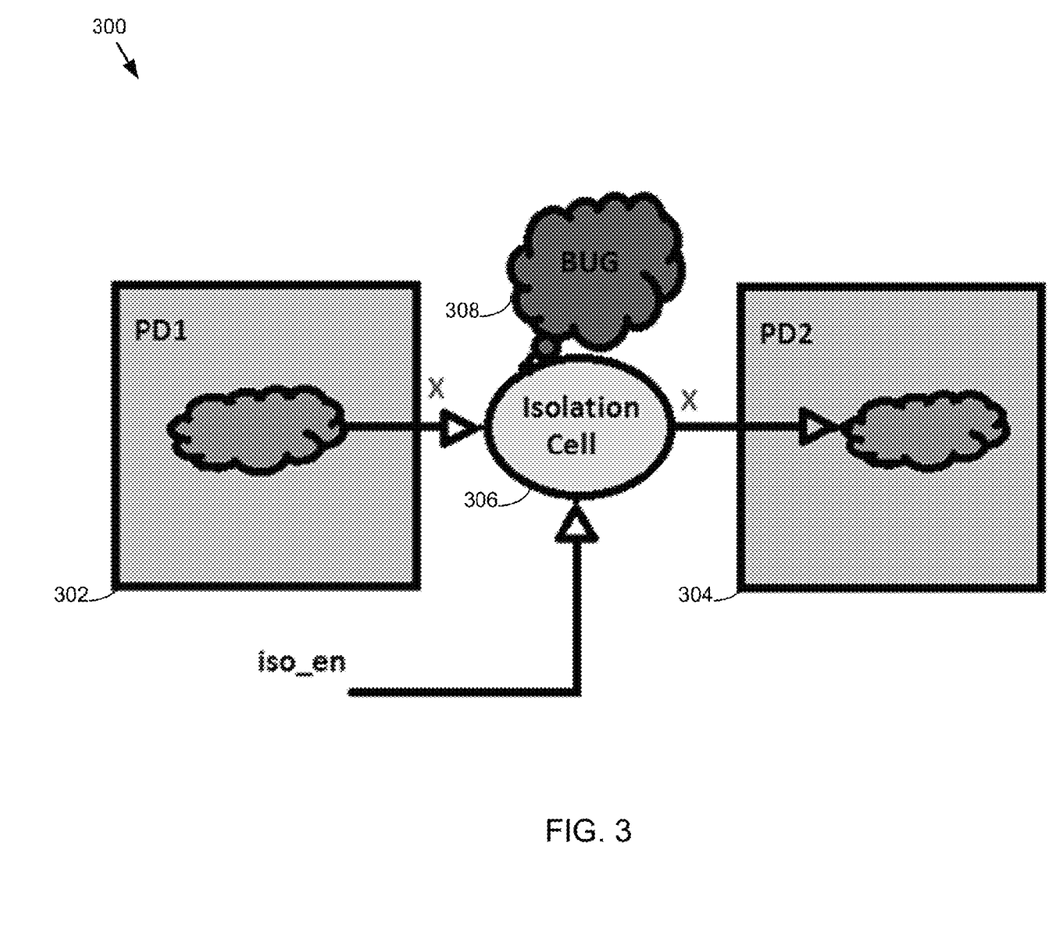
FIG. 3 is a diagram depicting an example depicting power domains in accordance with the present disclosure.

Referring now to FIG. 3, an embodiment depicting an example of an electronic design 300 consistent with the teachings of the present disclosure is provided. Electronic design 300 includes first power domain 302 and second power domain 304. Although, two power domains are shown in FIG. 3 it should be noted that any number of power domains may be used without departing from the scope of the present disclosure. Electronic design 300 may further include isolation logic 306, which may include one or more bugs 308. In this particular example, first power domain 302 is switched off and second power domain 304 is on. When first power domain 302 is switched off isolation logic 306 is enabled and an X is forced within first power domain 302. If there is a bug 308 in isolation logic 306 or if the isolation logic 306 is completely missing then an X from first power domain 302 may enter second power domain 304, thus corrupting the logic in second power domain 304.

Another challenging aspect in Low Power Designs is state retention. In some embodiments, verification process 10 may require the state of a powered off domain to be equivalent both before and after the low power mode. In order to achieve this, the values of registers may be saved in memory and restored back after exiting the low power mode. In this case, it may be necessary to ensure that the outputs are driven to a known good value before isolation is removed. Bugs in state retention logic may drive unknown values (X's) in the design leading to corruption of logic.

In some embodiments, these X's from powered off domains may go undetected during RTL simulation due to X-Optimism, resulting in X-bugs during Gate Level Simulation. However, the defects identified during Gate Level simulation are generally very late in the cycle. An incorrect isolation or a register missed from retention may not be found until days before tape-out.

Figure 4:
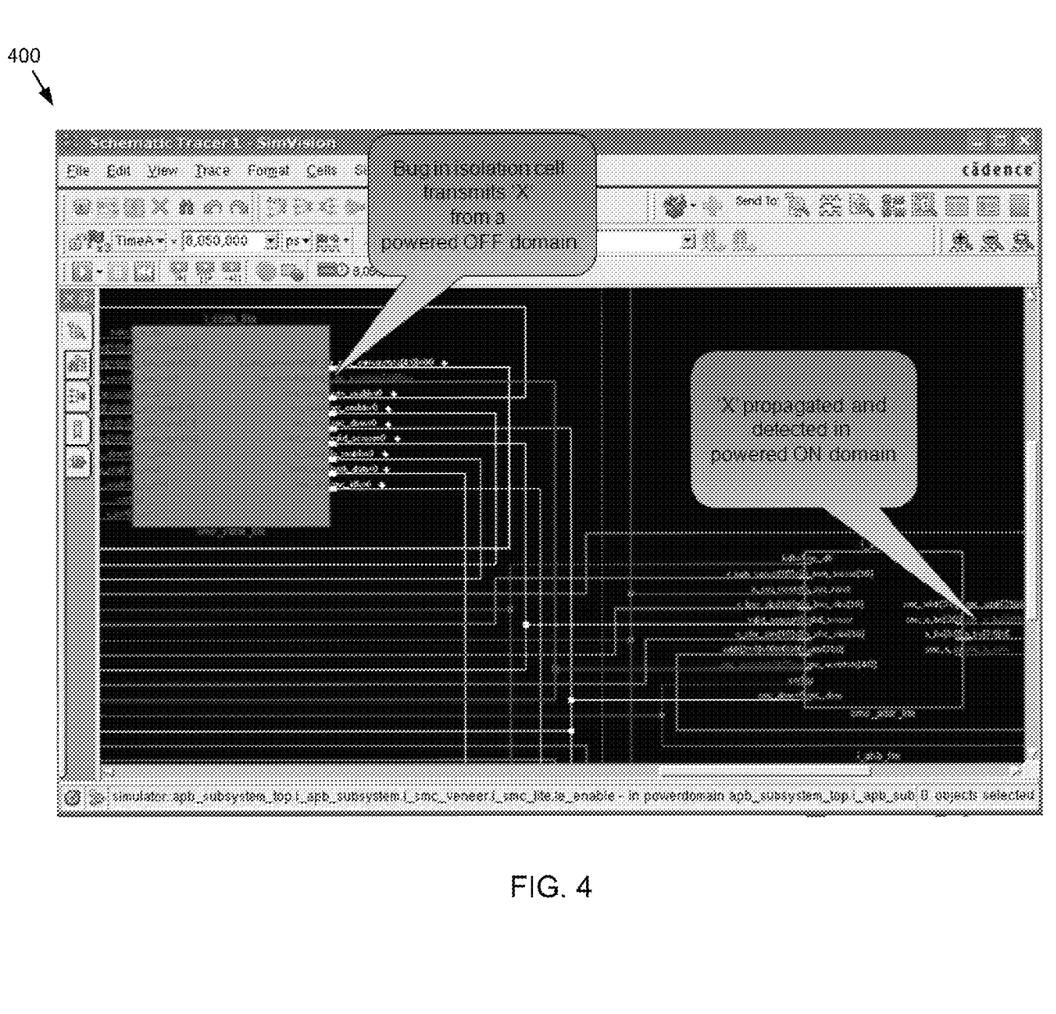
FIG. 4 is a screenshot depicting a display consistent with the verification process in accordance with an embodiment of the present disclosure.
Figure 5:
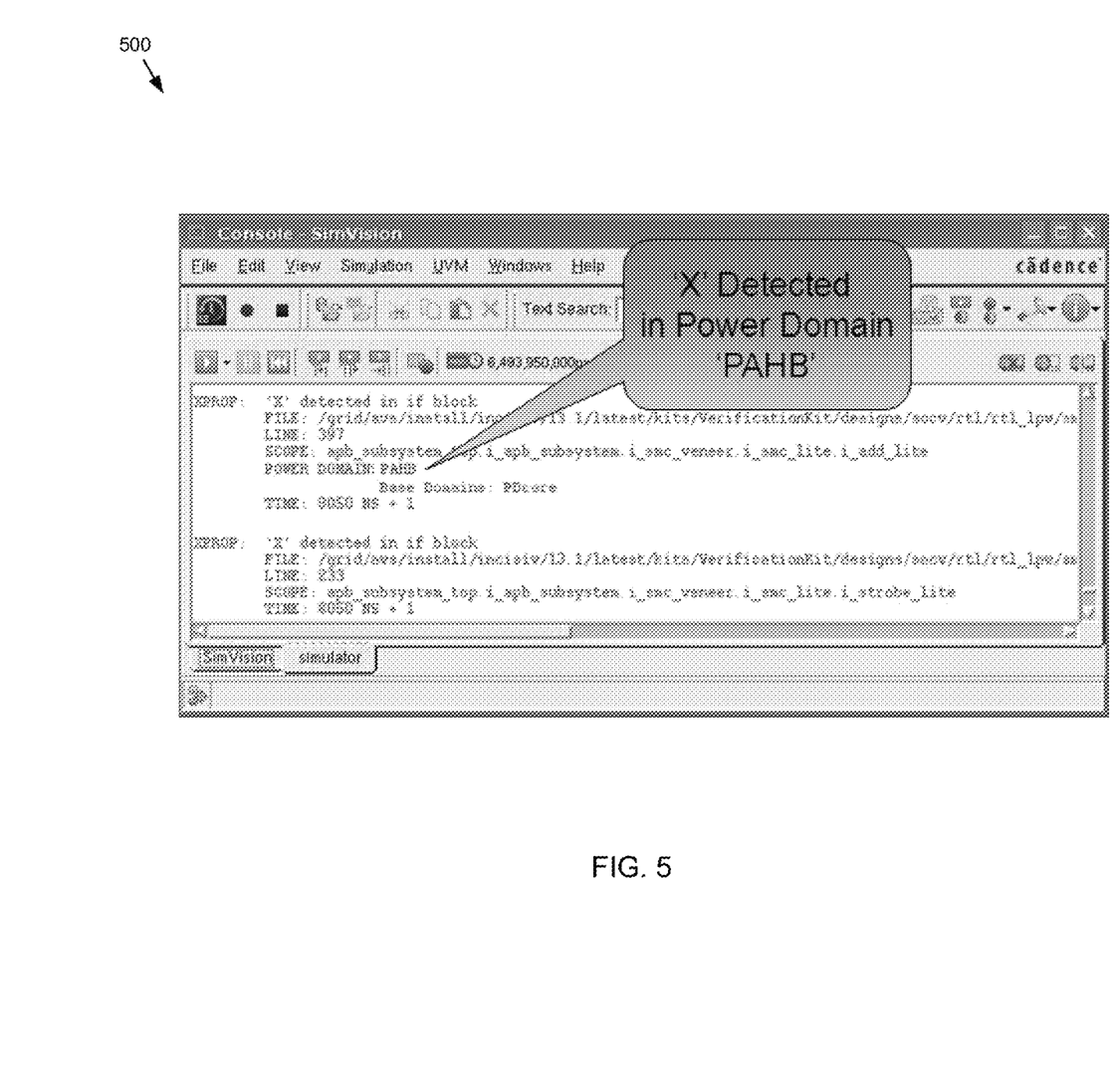
FIG. 5 is a screenshot depicting a display consistent with the verification process in accordance with an embodiment of the present disclosure.

In some embodiments, and referring to FIGS. 4-5, the present disclosure allows for the use of X-Propagation in a simulator, therefore the X-bugs may be detected during RTL itself. In this way, the simulator may be configured to detect these bugs during RTL simulation with the use of X-Propagation methodology. Accordingly, verification process 10 focuses on a solution which detects the X-bugs in the isolation logic and state retention for Low Power Designs using the X-Propagation technology, leading to complete verification of isolation logic at RTL verification stage itself.

FIG. 4 depicts an embodiment of a graphical user interface 400 consistent with the teachings of the verification process 10 described herein. Interface 400 may include a schematic tracer configured to display some of the operations described herein. As shown in the Figure, interface 400 may be configured to display the presence of a bug in an isolation cell transmits an X from a powered off domain. Interface 400 also shows that an X was propagated and detected in a powered on domain.

In some embodiments, verification process 10 may be customized to handle low power designs and verify isolation logic and state retention. In this way, the X-Propagation solution may provide two modes of operations to propagate x values encountered during simulation. In one mode X (e.g., unknown) values are propagated favorably when there is a contention of different values. In a second mode, the X values are propagated more pessimistically, for example, X may be propagated irrespective of the values being assigned. With X-Propagation capabilities, the behavior of RTL simulation is closer to gate level simulation, thereby catching X-bugs at the RTL level. This avoids the costly gate level simulation to uncover such bugs, thus saving months of time and effort by catching bugs at RTL level.

Accordingly, with low power designs, verification process 10 may identify the power domains that are turned on and during simulation checks for X values within the logic of powered on and active domains. If an X is detected then the propagation may be performed depending upon the mode of operation. Verification process 10 may be tuned to figure out if a domain is powered off and accordingly X-Propagation may not be performed for the logic inside that domain. Also, during the power up and power down sequences these X's may be ignored as the design is deliberately forcing X values with the power domain.

Referring again to FIGS. 4-5, embodiments depicting graphical user interfaces that may be used in accordance with verification process 10 are provided. If the X values propagated from power domains reach an observable point, then the designer may then trace back the cause of this X using the debug capabilities of simulator. In this way, verification process 10 may allow, at a graphical user interface, a user-selectable option to identify and display a cause of the at least one X-value. This may help the verification/design engineer isolate the cause of X-bug. The debug capabilities of the simulator are enhanced in GUI to trace back the X value to their cause using one or more selectable features (e.g. 'Go to Cause'). In this way, verification process 10 may display, at a graphical user interface, an interface port associated with the at least one X value, the interface port indicating an entry point for the at least one X value. For example, using a schematic tracer, such as that shown in FIG. 4, that may directly point to the interface port from where the X entered into the power domain.

In some embodiments, the verbosity for X-Propagation during simulation gives the complete information of where the X is detected. This information may include, but is not limited to, the file, line, scope and time where X was detected within the power domain. This information can be easily used to identify the power domain where X appeared. The X-propagation verbosity may be customized to handle the power up and power down sequences, and also the power domains that are switched off. In these cases the verbosity messages are suppressed thus reducing unnecessary noise. Accordingly, unless the X value propagates to powered on domain which can be due to missing isolation logic, a bug in isolation logic or a bug in state retention, the X-Propagation solution may not render any noise. This allows for avoidance of the false X's existing in the low power design.

The verification process 10 described herein may provide a number of advantages over previous solutions. Some of these may include, but are not limited to, no change in RTL is required, no test bench writing effort is required, it enables verification of low power logic at the RTL level, there are no scalability issues even for modern SoCs, a faster turnaround time with identification and fixing of bugs at RTL level is provided, and it may save months of effort involved in detecting these bugs using gate level simulation.

In some embodiments, the phrase "at least one X value" as used herein may refer to a singular X value, more than one X value, or may refer to all X values. Similarly, the phrase "a second X value" may refer to a singular X value, more than one X value, or all X values.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design verification comprising:
   providing, using a processor, a low-power electronic design;
   determining if a power domain associated with the low-power electronic design is active; and
   identifying, at a register transfer level (RTL), at least one X value associated with an active power domain wherein identifying occurs during a simulation.

2. The computer-implemented method of claim 1, further comprising:
   if the power domain associated with the low-power electronic design is inactive, ignoring the power domain for X propagation.

3. The computer-implemented method of claim 1, further comprising:
   ignoring a second X value during at least one of a power up and a power down sequence.

4. The computer-implemented method of claim 1, further comprising:
   displaying, at a graphical user interface, an interface port associated with the at least one X value, the interface port indicating an entry point for the at least one X value.

5. The computer-implemented method of claim 1, further comprising:
   generating information related to the at least one X value, the information including one or more of file, line, scope and time of detection of the at least one X value.

6. The computer-implemented method of claim 1, wherein the at least one X value includes one or more of don't care X values, unknown X values, and wildcard X values.

7. The computer-implemented method of claim 1, further comprising:
   allowing, at a graphical user interface, a user-selectable option to identify and display a cause of the at least one X-value.

8. A computer-readable storage medium for electronic design verification, the computer-readable storage medium having stored thereon instructions that when executed by a machine result in one or more operations, the operations comprising:
   providing, using a processor, a low-power electronic design;
   determining if a power domain associated with the low-power electronic design is active; and
   identifying, at a register transfer level (RTL), at least one X value associated with an active power domain wherein identifying occurs during a simulation.

9. The computer-readable storage medium of claim 8, further comprising:
   if the power domain associated with the low-power electronic design is inactive, ignoring the power domain.

10. The computer-readable storage medium of claim 8, further comprising:
    ignoring a second X value during at least one of a power up and a power down sequence.

11. The computer-readable storage medium of claim 8, further comprising:
    displaying, at a graphical user interface, an interface port associated with the at least one X value, the interface port indicating an entry point for the at least one X value.

12. The computer-readable storage medium of claim 8, further comprising:
    generating information related to the at least one X value, the information including one or more of file, line, scope and time of detection of the at least one X value.

13. The computer-readable storage medium of claim 8, wherein the at least one X value includes one or more of don't care X values, unknown X values, and wildcard X values.

14. The computer-readable storage medium of claim 8, further comprising:

allowing, at a graphical user interface, a user-selectable option to identify and display a cause of the at least one X-value.

15. A system for electronic design verification comprising:
a computing device having at least one processor configured to provide a low-power electronic design and determine if a power domain associated with the low-power electronic design is active, the at least one processor further configured to identify, at a register transfer level (RTL) at least one X value associated with an active power domain wherein identifying occurs during a simulation.

16. The system of claim 15, wherein the at least one processor is further configured to if the power domain associated with the low-power electronic design is inactive, ignore the power domain.

17. The system of claim 15, wherein the at least one processor is further configured to ignore a second X value during at least one of a power up and a power down sequence.

18. The system of claim 15, wherein the at least one processor is further configured to display, at a graphical user interface, an interface port associated with the at least one X value, the interface port indicating an entry point for the at least one X value.

19. The system of claim 15, wherein the at least one processor is further configured to generate information related to the at least one X value, the information including one or more of file, line, scope and time of detection of the at least one X value.

20. The system of claim 15, wherein the at least one X value includes one or more of don't care X values, unknown X values, and wildcard X values.

\* \* \* \* \*